United States Patent [19]
Luckers

[11] 3,727,450
[45] Apr. 17, 1973

[54] GAS COMPOSITION ANALYSIS

[75] Inventor: John Lückers, Liege, Belgium

[73] Assignee: Centre National de Recherches Metallurgiques, Brussels, Belgium

[22] Filed: Jan. 28, 1971

[21] Appl. No.: 110,633

[30] Foreign Application Priority Data

Jan. 28, 1970 Belgium..............................745109

[52] U.S. Cl................73/23, 73/432 A, 356/51
[51] Int. Cl............................G01n 21/00, G01d 3/02
[58] Field of Search..........................73/432 A, 23 R; 356/51

[56] References Cited

UNITED STATES PATENTS

| | | | |
|---|---|---|---|
| 3,605,484 | 9/1971 | Wumning | 73/23 |
| 2,734,376 | 2/1956 | Cherry | 73/27 |
| 2,949,765 | 8/1960 | Thayer | 73/27 |
| 3,359,784 | 12/1967 | Jorre | 73/23 |
| 3,432,288 | 3/1969 | Ardido | 73/23 |

Primary Examiner—S. Clement Swisher
Attorney—Holman & Stern

[57] ABSTRACT

Gas analysis apparatus comprising gas analyzers and calibration units, each having a variable characteristic, is adjusted by two steps. Firstly, the characteristics of the calibration units are modified to correct the analyzer output signals so as to compensate for drift in the analyzers. The modification of each unit is by independent zero and gain corrections. Secondly, the output signal of each unit is corrected according to the relation:

$$C_x - C'_x = f(C_1, C_2, \ldots C_n, C_x),$$

where $C_x$ is the true concentration of the gas detected by the $x^{th}$ analyzer, $C'_x$ is the concentration represented by the calibration unit output, $C_1 \ldots C_n$ are the true concentrations of the other gases, and $f$ is a mathematical function.

12 Claims, 5 Drawing Figures

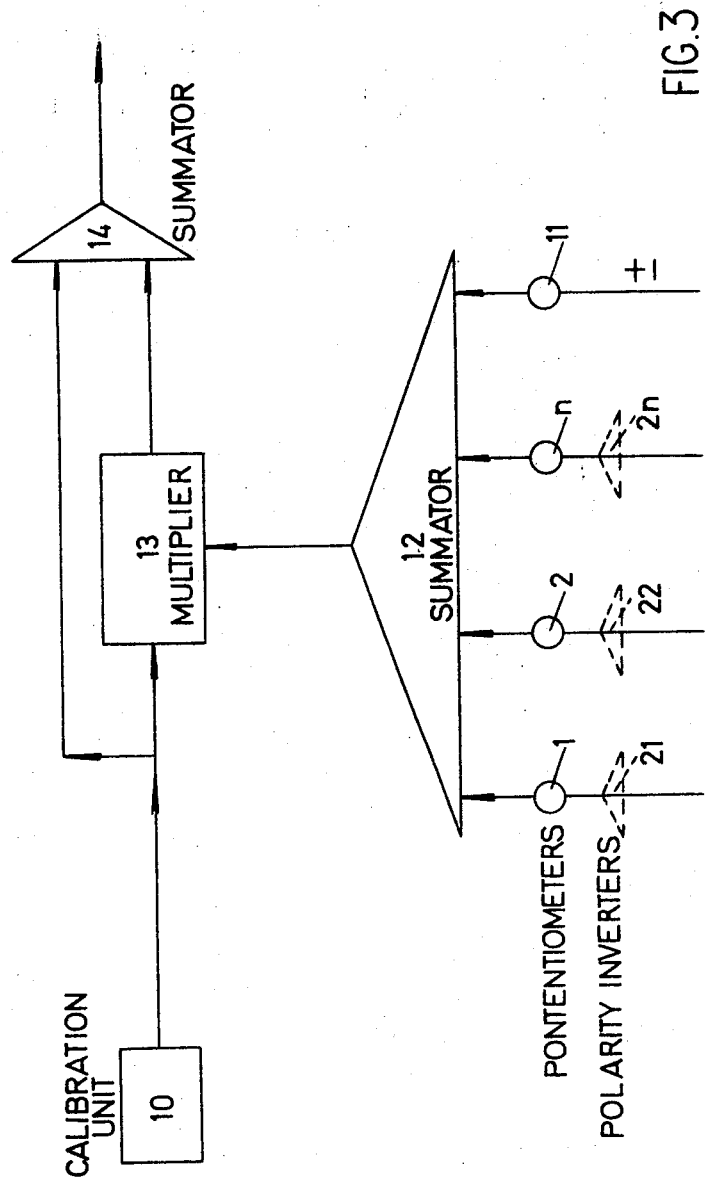

GAS COMPOSITION ANALYSIS

The present invention relates to improvements in the method of continuous analysis of the composition of a gas, as described in British Pat. No. 1,157,139 and U.S. Pat. No. 3,504,521.

Appropriate analyzers for analyzing the concentration of a particular gas in a gas mixture are well known; for instance, infra-red gas-analyzers. Since the output signals of the analyzers always tends to drift, it is necessary to carry out periodic calibration of the output signals by using samples of standard gas-mixtures. For this reason, gas analysis equipment comprises not only an analyzer, but also a calibration unit which adjusts the analyzer periodically, and a recorder for recording the measurements supplied by the analyzer.

A method for the adjustment of gas analysis apparatus has been described in the above-mentioned patent specifications wherein the characteristic of the calibrating unit is modified by independent zero and gain corrections to correct the output signal to the recorder so as to compensate for drift in the gas analyzer. The recorder may for example, be an electronic calculator.

The results obtained in industrial practice with such analysis apparatus are very satisfactory but it is apt to consider that the proportions of the other gas or gases in the mixture influences the measurement appreciably.

In the case of analyzers operating by absorption of infra-red radiation, this influence is related to the very nature of the absorption phenomenon and is either because the absorption bands of the gas which is to be detected overlap bands of the other gases present, or because of the deformation of the absorption bands of the gas to be detected owing to the presence of other gases.

As for the overlapping of the absorption bands, the use of radiation filters often renders it possible to eliminate their effects.

By contrast, it is impossible to eliminate the influence of deformations of the bands in non-dispersive analyzers.

To establish the quantitative effect of this phenomenon on the analysis of blast furnace gases and steelworks fumes, an experimental study has been carried out with analyzers of different types by means of gaseous mixtures prepared by means of volumetric precision pumps.

In the following text we refer to the accompanying drawings, in which:

FIG. 3 is a block diagram of a correction circuit; and

FIGS. 1a,1b,2a,and 2b show some results obtained for analyzers of two types. Each of the curves was obtained by employing ternary mixtures in which nitrogen was replaced progressively by the "interfering" gas under examination, that is to say $O_2$, $CO_2$, $H_2$ for the CO analyzer, and $O_2$, CO,$H_2$ for the $CO_2$ analyzer.

FIGS. 1a and 1b apply to the influence of different gases on the readings of two types of analyzer (type 1 and type 2) using infra-red radiation when the concentration of the gas to be detected is kept constant. In the case of the CO analyzer (FIG. 1a), the mixtures in question contain 10 percent by volume of CO, and in the case of the $CO_2$ analyzer, the mixtures in question contain 10 percent by volume of $CO_2$. The error in percent by volume in the measured value of the volumetric concentration of the gas being detected is plotted as ordinates, and the volumetric concentration of the interfering gas in percent is plotted as abscissae; the balance is nitrogen.

Figure 1:
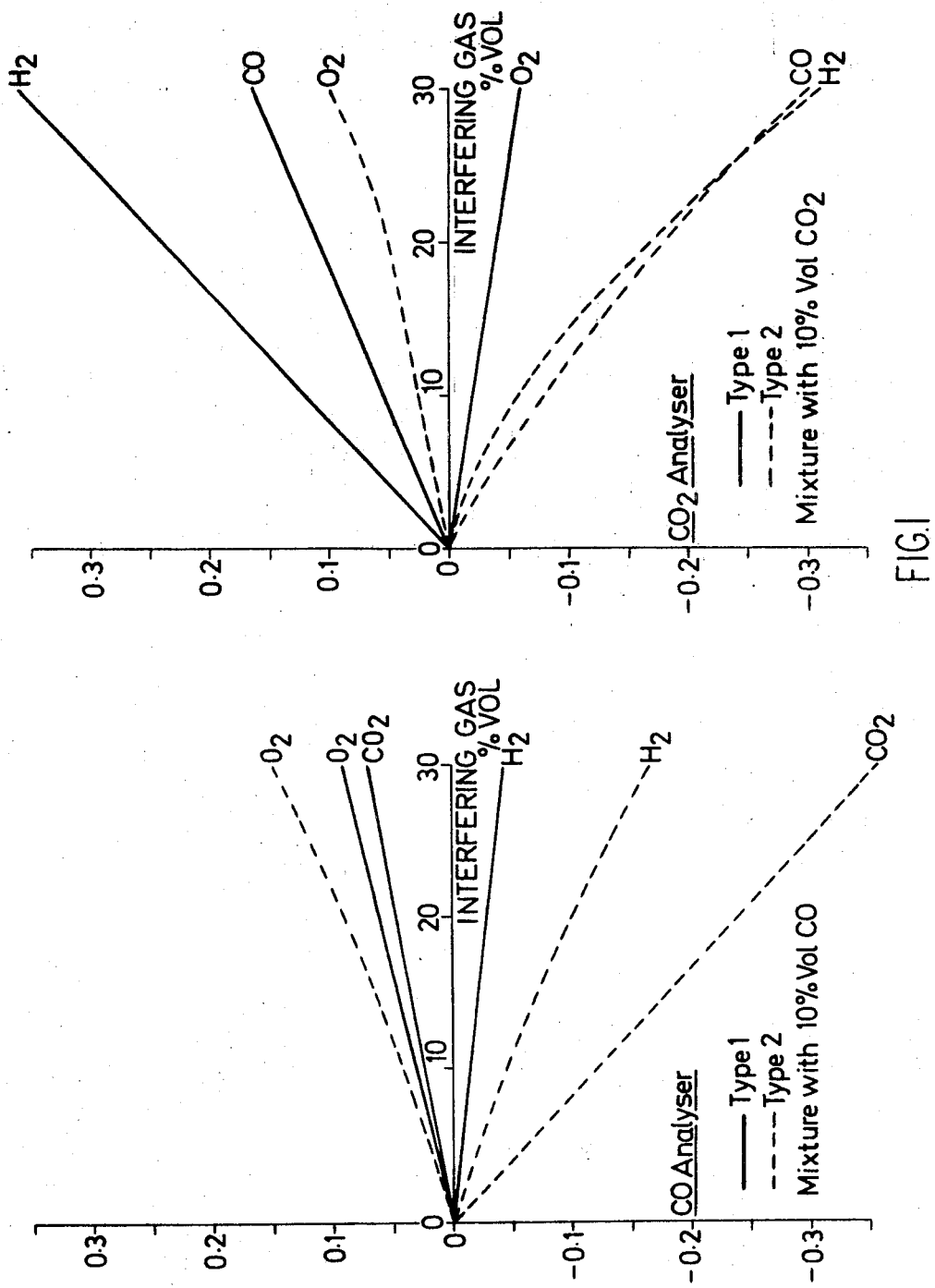
FIG. 1a is a graph showing the influence of different gases on the reading of a CO analyzer, plotted against concentration of gas.
FIG. 1b is a similar graph for a $CO_2$ analyzer.
Figures 2A, 2B:
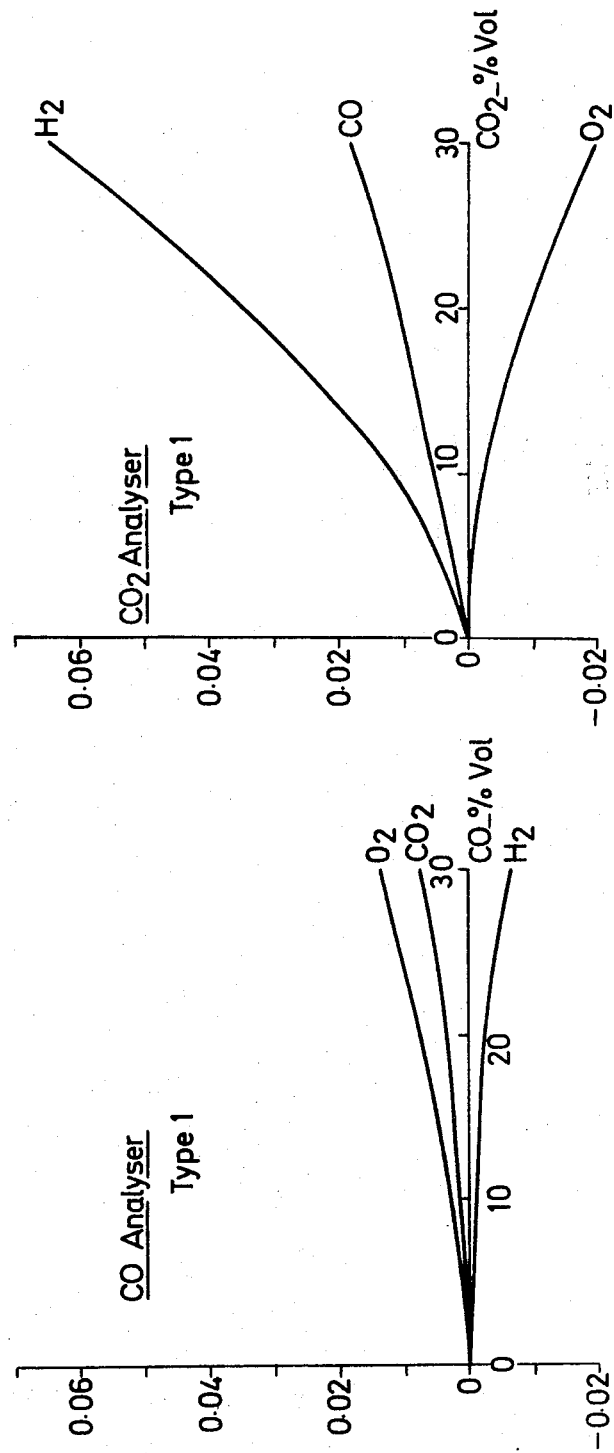
FIG. 2a is a graph showing the influence of different gases on the reading of a CO analyzer, plotted against concentration of CO.
FIG. 2b is a similar graph for a $CO_2$ analyzer.

FIGS. 2a and 2b apply to the variation of the action of different gases on the readings of infra-red analyzers (type 1), as a function of the concentration of the gas being detected. The error in percent by volume in the measured value of the volumetric concentration of the gas being detected per percent of interfering gas is plotted as ordinates, and the concentration in percent by volume of the gas being detected is plotted as abscissae.

The experimental results show clearly that in the case of the CO and $CO_2$ infra-red analyzers, the using infra-red radiation, the influence of the other gases is appreciable and cannot be disregarded. Moreover, the magnitude and sign of the errors vary considerably from one type of analyzer to another.

It should be noted that in the case of gases other than CO and $CO_2$, and particularly for analyzing $H_2$ and $O_2$ in blast furnace gases and steelworks fumes, for example, analyzers are available for which the influence of the other gases present is corrected according to laws which are well known and intrinsic for each type of analyzer.

The present invention provides a method for the adjustment of gas analysis apparatus comprising gas analyzers adapted to supply signals to respective calibration units, each having a variable characteristic and being adapted to supply an output signal to a corresponding recorder, the method comprising:

i. modifying the characteristics of the calibration units to correct the output signals to the recorders so as to compensate for drift in the gas analyzers, the modification of each unit being achieved by independent zero and gain corrections; and ii. correcting the output signal of each calibration unit according to the following relation:

$$C_x - C_x' = f(C_1, C_2, \ldots C_n, C_x),$$

where $C_x$ is the true concentration of the gas detected by the $x^{th}$ analyzer;

$C_x'$ is the concentration of the gas detected by the $x^{th}$ analyzer, as indicated by the output signal of the corresponding calibration unit;

$C_1, C_2, \ldots C_n$ respectively represent the true concentrations of the gases detected by the $1^{st}$, $2^{nd}$, ... $n^{th}$ analyzers except the $x^{th}$ analyzer, and $f$ is a mathematical function selected in accordance with the behavior of the analyzers and of the ranges within which the concentrations of the gases vary.

In the present specification, the term concentration is to be taken as meaning volumetric concentration.

This correcting operation may be performed either by means of a computer programmed to calculate the value of the function $f$, or by means of an array of modules, preferably electronic, assembled from analog calculation elements and incorporated in the calibrating units. It can be seen that the function $f$ itself includes $C_x$; however, an iterative process can be used to find $C_x$ from the above relation.

For the purpose of simplifying the function $f$ expressing the correction to be applied to the indicated concentration $C_x'$ to obtain the true concentration $C_x$ of the gas being detected, whilst maintaining an acceptable precision, a linear function can be derived by approximating the interference curves (see FIGS. 1a to 2b for example) to straight lines.

The expression according to which a correcting operation is imposed on the indicated concentration of the gas being detected in the mixture, then has the following simplified form:

$$C_x - C_x' = (aC_1 + bC_2 + \ldots + jC_n + K) \cdot C_x$$

where $a, b, \ldots j, K$ are constants, selected according to the behavior of the actual analyzers and of the ranges within which the concentrations of the gases in the mixture vary.

From the simplified expression given above, it is apparent that the correction to be applied to the output signal (indicated concentration) of the calibration unit is proportional to the true concentration $C_x$. However, given that the difference between the indicated and true concentrations is negligible compared with the actual error in the measurement, the true concentration $C_x$ in the right hand side of the expression can advantageously be replaced by the indicated concentration of $C_x'$ and the correction to be applied is finally obtained according to the expression:

$$C_x - C'_x = (aC_1 + bC_2 + \ldots + jC_n + K) \cdot C_x',$$

which facilitates the assembling of the equipment and increases its stability in the case of the application of an array of analog modules.

The corrected measurement signal is advantageously transmitted to an apparatus which renders it possible to exploit the same, for example a calculator.

A correction circuit for carrying out the above process is illustrated in FIG. 3. Potentiometers 1, 2, ... $n$ respectively are set up to represent the absolute value of the constants $a, b, \ldots j$, and also receive signals representing the true concentrations $C_1, C_2, \ldots C_n$ of the gases in the mixture other than that to be detected. Thus the outputs of the potentiometers 1, 2, ... $n$ respectively provide signals representing $aC_1, bC_2, \ldots jC_n$. A potentiometer 11 is set up to represent the absolute value of the constant $K$. In the case in which the coefficients $a, b, \ldots n$ are negative, the potentiometers 1, 2, ... $n$ are associated with polarity inverter modules 21, 22, ... 2n. In the case in which the constant $K$ is negative, the potentiometer 11 is supplied with a negative voltage.

A summator module 12 receives the signals representative of the terms $aC_1, bC_2, \ldots jC_n, K$, and provides an output signal representing the expression:

$$aC_1 + bC_2 + \ldots + jC_n + K.$$

A multiplier module 13 receives the signal from the summator module 12, and a signal representing $C_x'$ (the concentration in the gas mixture of the gas detected) from the output of the calibration unit 10 of the appropriate analyzer (not shown). The multiplier module 13 provides a signal representing the expression:

$$(aC_1 + bC_2 + \ldots + jC_n + K) \cdot C_x'.$$

Finally a summating module 14 receives the signal from the multiplier module 13 and the signal ($C_x'$) from the calibration unit 10. This summating module 14 provides an output signal representing the expression:

$(1 + aC_1 + bC_2 + \ldots jC_n + K) \cdot C_x'$, that is to say a signal representing the term $C_x$.

In the case in which signals representing indicated concentrations of the $n$ components of a gas mixture are obtained at the output points of the calibration units of the appropriate analyzers, the analysis apparatus will comprise $n$ correction circuits each corresponding to one of the $n$ components. Each correction circuit will receive the indicated concentration ($C_x'$) of the gas detected by the corresponding analyzer and the true concentrations ($C_1 \ldots C_n$) of the other $n - 1$ components originating from the other $n - 1$ correction circuits, each of these $n$ correctors delivering at its output the true concentration ($C_x$) of the corresponding component.

Figure 4:
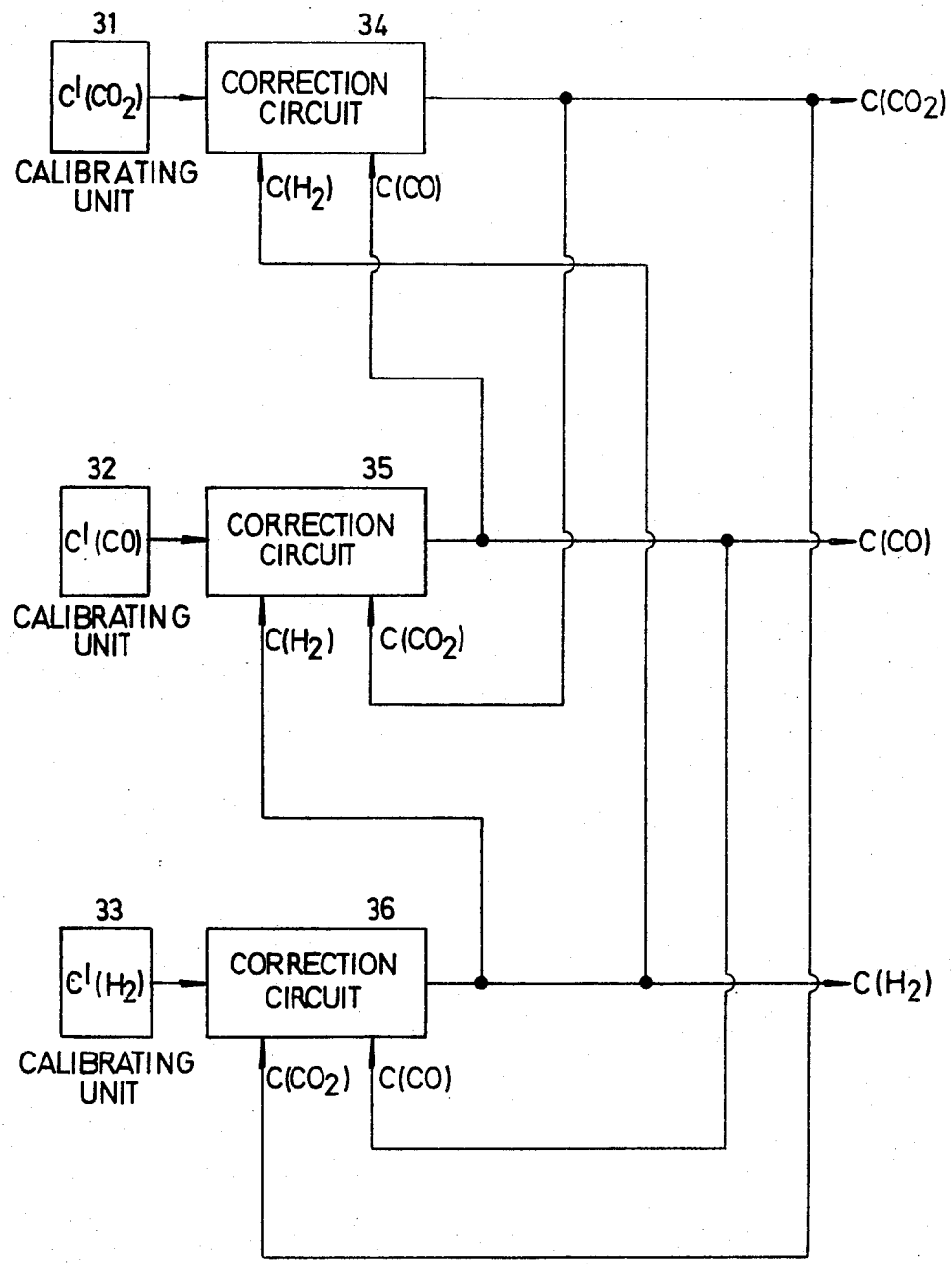
FIG. 4 is a block diagram of a correction circuit for three calibration units.

To convey a clear grasp of the operation of such a circuit, the case of an apparatus comprising three correction circuits applicable to the concentrations of $CO_2$, $CO$, and $H_2$ has been illustrated by way of example in FIG. 4.

Signals representing the indicated concentrations of $CO_2$, $CO$, and $H_2$ are obtained, respectively, at the outputs of three calibrating units 31, 32, 33. Three corresponding correction circuits 34, 35, 36, applicable to the corresponding three gases, receive the respective signals representing the indicated concentrations $C'(CO_2)$, $C'(CO)$, $C'(H_2)$ of the gases being detected. Each correction circuit (e.g., 34) also receives the signals representing the true concentrations ($C(CO)$, $C(H_2)$) of the two other gases ($CO$, $H_2$) originating from the other two correction circuits (35, 36). In this way, the true concentration of $CO_2$ is obtained at the output of the circuit 34, the true concentration of $CO$ at the output of the circuit 35, and the true concentration of $H_2$ at the output of the circuit 36.

I claim:

1. A method for the adjustment of gas analysis apparatus comprising gas analyzers adapted to supply signals to respective calibration units, each having a variable characteristic and being adapted to supply an output signal to a corresponding recorder, the method comprising:

i. Modifying the characteristics of the calibration units to correct the output signals to the recorders so as to compensate for drift in the gas analyzers, the modification of each unit being achieved by independent zero and gain corrections; and ii. Correcting the output signal of each calibration unit according to the following relation:

$$C_x - C'_x = f(C_1, C_2, \ldots C_n, C_x),$$

where $C_x$ is the true concentration of the gas detected by the $x^{th}$ analyzer;

$C_x'$ is the concentration of the gas detected by the $x^{th}$ analyzer, as indicated by the output signal of the corresponding calibration unit;

$C_1, C_2, \ldots C_n$ respectively represent the true concentrations of the gases detected by $1^{st}, 2^{nd}, \ldots n^{th}$ analyzers, except the $x^{th}$ analyzer; and $f$ is a mathematical function selected in accordance with the behavior of the analyzers and of the ranges within which the concentrations of the gases vary.

2. A method as claimed in claim 1, in which the said correcting step is performed by an electronic computer programmed to calculate the value of the said function.

3. A method as claimed in claim 1, in which the said correcting step is performed by an analog circuit.

4. A method as claimed in claim 3, in which the said correcting step is performed by an electronic analog circuit.

5. A method as claimed in claim 3, in which the analog circuit is incorporated in the calibrating unit.

6. A method as claimed in claim 1, in which $$f = (aC_1 + bC_2 + \ldots + jC_n + K) \cdot C_x$$

where $a, b, \ldots j, K$ are constants selected in accordance with the behavior of the analyzers and of the ranges within which the concentrations of the gases vary.

7. A method as claimed in claim 6, in which, as an approximation, $C_x$ is replaced by $C_x'$.

8. A method as claimed in claim 1, further comprising recording the corrected output signal.

9. Gas analysis apparatus comprising a gas analyzer; a calibration unit adapted to receive input signals from the analyzer and to supply output signals to a recorder, the calibration unit including means for effecting independent zero and gain corrections of the characteristic of the calibration unit to compensate the output signals for drift of the gas analyzer; and a correction circuit adapted to correct the output signals of the calibration unit by the following relation:

$$C_x - C_x' = (aC_1 + bC_2 + \ldots + jC_n + K) \cdot C_x',$$

the correction circuit comprising:
a. $n - 1$ first potentiometers respectively set up to represent the absolute value of the constants $a, b, \ldots j$, and respectively intended to receive signals representing $C_1, C_2, \ldots C_n$, whereby the outputs of the potentiometers respectively provide signals representing $aC_1, bC_2, \ldots jC_n$;
b. a second potentiometer set up to represent the absolute value of the constant $K$;
c. a first summator connected to the outputs of the potentiometers, and adapted to provide an output signal representing the expression $aC_1 + bC_2 + \ldots + jC_n + K$;
d. a multiplier module connected both to the output of the calibration unit, whose output signal represents $C_x'$, and also to the output of the summator, whereby the output of the multiplier module provides a signal representing $(aC_1 + bC_2 + \ldots + jC_n + K) \cdot C_x'$; and
e. a second summator connected both to the output of the $x^{th}$ calibration unit and also to the output of the multiplier module, whereby the output of the second summator provides a signal representing $C_x$.

10. Gas analysis apparatus comprising a gas analyzer; a calibration unit adapted to receive input signals from the analyzer and to supply output signals to a recorder; and a correction circuit adapted to correct the output signals of the calibration unit by the following relation:

$$C_x - C'_x = (aC_1 + bC_2 + \ldots + jC_n + K) \cdot C'_x,$$

the correction circuit comprising:
a. $n - 1$ first potentiometers respectively set up to represent the absolute value of the constants $a, b, \ldots j$, and respectively intended to receive signals representing $C_1, C_2, \ldots C_n$, whereby the outputs of the potentiometers respectively provide signals representing $aC_1, bC_2, \ldots jC_n$;
b. a second potentiometer set up to represent the absolute value of the constant $K$;
c. a first summator connected to the outputs of the potentiometers, and adapted to provide an output signal representing the expression $aC_1 + bC_2 + \ldots + jC_n + K$;
d. a multiplier module connected both to the output of the calibration unit, whose output signal represents $C_x'$, and also to the output of the summator, whereby the output of the multiplier module provides a signal representing $(aC_1 + bC_2 + \ldots + jC_n + K) \cdot C'_x$; and
e. a second summator connected both to the output of the $x^{th}$ calibration unit and also to the output of the multiplier module, whereby the output of the second summator provides a signal representing $C_x$.

11. A method for the correction of measurement made by gas analysis apparatus comprising a gas analyzer adapted to supply an output signal to a recorder or indicator, the method comprising:

correcting the output signal according to the following relation:

$$C_x - C_x' = f(C_1, C_2, \ldots C_n, C_x),$$

where $C_x$ is the true concentration of the gas to be detected;

$C_x'$ is the concentration of the gas detected in the mixture, as indicated by the uncorrected output signal;

$C_1, C_2, \ldots C_n$ respectively represent the true concentrations of the other gases in the mixture; and $f$ is a mathematical function selected in accordance with the behavior of the analyzer and of the ranges within which the concentrations of the gases vary.

12. Gas analysis apparatus as claimed in claim 10 comprising $n$ gas analyzers, $n$ calibration units, and $n$ correction circuits, and the $n-1$ first potentiometers of each correction circuit are respectively connected to the outputs of the second summators of the other $n-1$ correction circuits.

* * * * *